United States Patent [19]
Phillips

[11] 3,785,024
[45] Jan. 15, 1974

[54] METHOD FOR FORMING SELF-ALIGNING BEARING STRUCTURES

[75] Inventor: Benjamin Phillips, Owosso, Mich.

[73] Assignee: Universal Electric Company, Owosso, Mich.

[22] Filed: May 1, 1972

[21] Appl. No.: 249,191

[52] U.S. Cl.............................................. 29/149.5 B
[51] Int. Cl................................................ B23p 11/00
[58] Field of Search............... 29/149.5 B, 148.4 A, 29/148.4 C, 159.01, 159.3, 453, 513, 200 B, 29/200 P; 113/117

[56] References Cited
UNITED STATES PATENTS

| | | | |
|---|---|---|---|
| 1,402,071 | 1/1922 | Huther | 29/148.4 C |
| 1,726,985 | 3/1929 | Hodge | 29/201 D |
| 3,182,379 | 5/1965 | Bachelet et al. | 29/148.4 A |
| 3,529,874 | 9/1970 | Hoddy | 308/72 |
| 3,701,574 | 10/1972 | Phillips | 308/72 |

*Primary Examiner*—Thomas H. Eager
*Attorney*—Arthur Raisch et al.

[57] ABSTRACT

A method for forming self-aligning bearing structures from a workpiece having radially extending fingers to form a bearing having cantilever mounted segments. Each segment has a first portion extending generally radially and a second portion forming a free end extending generally axially so that the segment is yieldable axially. The ends of the segments define a cylindrical supporting surface that engages a spherical contacting surface of a bearing member which has a bore therein for receiving the shaft of the rotor. Alternate segments have their free ends extending generally axially in opposite directions from adjacent segments. Portions of the fingers are engaged to form the free end portions into the second portions extending axially in opposite directions.

4 Claims, 10 Drawing Figures

PATENTED JAN 15 1974 3,785,024

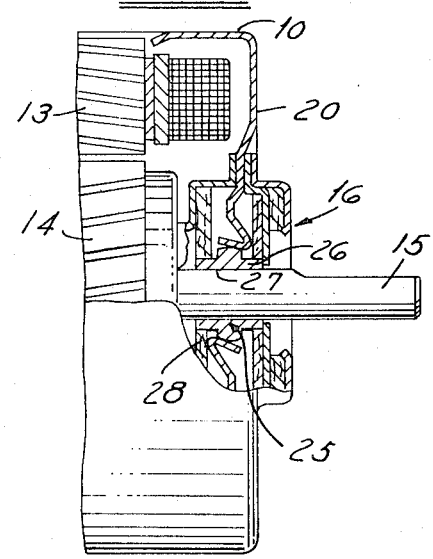
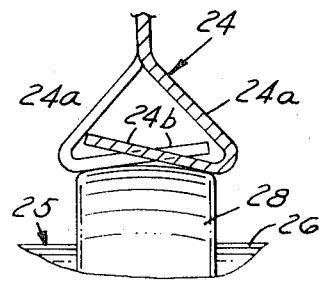
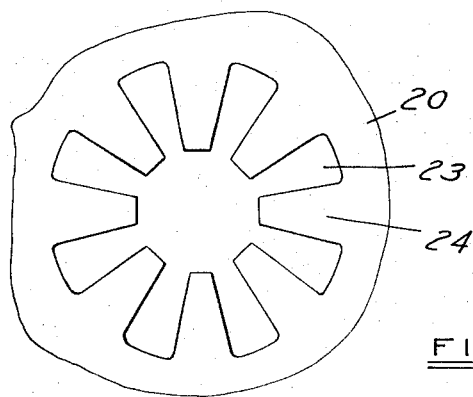
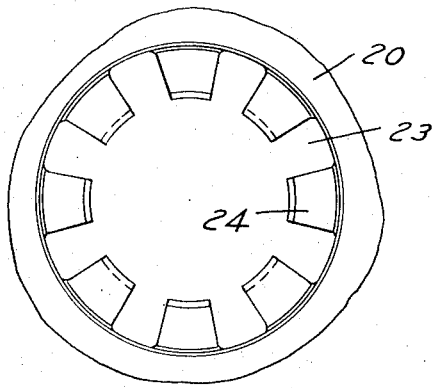
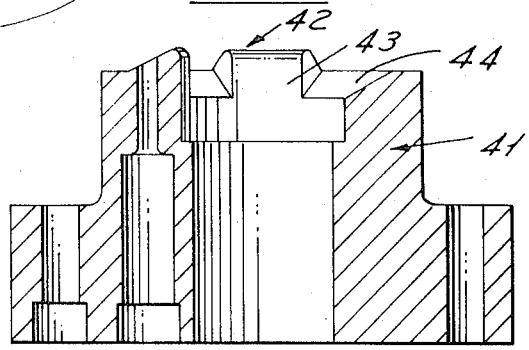

ial portion 24a joined to the wall 20 and a second generally axial portion 24b extending axially and comprising the free end of each segment. The wall 20 is made of metal such that each segment 24 which is cantilever mounted has limited axial movement, as presently described.

METHOD FOR FORMING SELF-ALIGNING BEARING STRUCTURES

This invention relates to bearing structures and particularly to a method for forming bearing structures of the type disclosed and claimed in the copending application Ser. No. 170,441, filed Aug. 10, 1971, U.S. Pat. No. 3,701,574, titled BEARING STRUCTURE and having a common assignee with the present invention.

BACKGROUND OF THE INVENTION

In the aforementioned copending application there is disclosed a bearing structure where an electric motor comprises a motor housing, a stator and a rotor. The housing has an end wall with an opening therein and slots extending radially outwardly from the opening to define a plurality of cantilever mounted segments. Each segment has a first portion extending generally radially and a second portion forming a free end extending generally axially so that the segment is yieldable axially. The ends of the segments define a cylindrical supporting surface that engages a spherical contacting surface of a bearing member which has a bore therein for receiving the shaft of the rotor. Alternate segments have their free ends extending generally axialy in opposite directions from adjacent segments.

Among the objects of the present invention are to provide a method for forming bearing structures of the aforementioned type with accuracy and facility; wherein concentricity of the bearing structure is maintained regardless of the thickness and temper variations in the metal; and which will produce a bearing structure at low cost.

SUMMARY OF THE INVENTION

In accordance with the invention, a workpiece is first formed with a plurality of circumferentially spaced radially inwardly extending fingers with the ends of the fingers forming an opening. Some of the fingers are thereafter simultaneously bent axially in one direction while others are bent axially in the opposite direction.

DESCRIPTION OF THE DRAWINGS

FIG. 6 is a part sectional fragmentary view of an electric motor embodying the bearing structure made in accordance with the invention.

FIG. 7 is a fragmentary sectional view on an enlarged scale of a portion of the motor structure shown in FIG. 6.

FIG. 8 is an end view of a portion of the bearing structure shown in FIG. 7.

FIG. 9 is a sectional view taken along the line 9—9 in FIG. 1 of another portion of the apparatus on an enlarged scale.

FIG. 10 is a fragmentary plan view of a portion of a workpiece utilized in the method and apparatus.

DESCRIPTION

Figure 1:
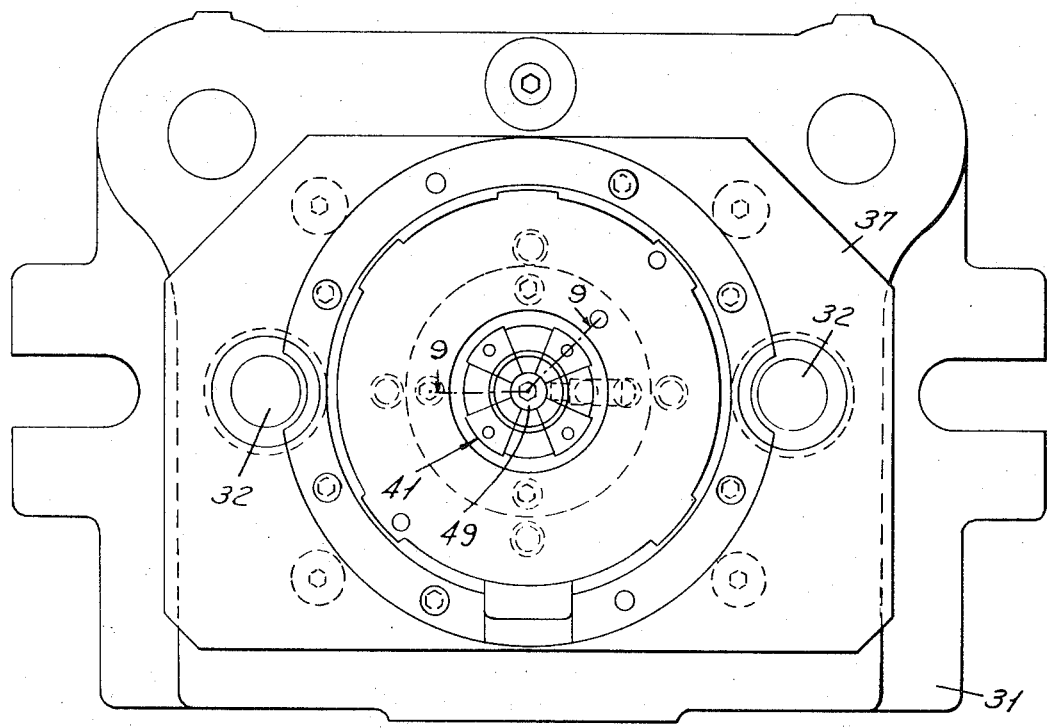
FIG. 1 is a plan view of a portion of the apparatus embodying the invention.

Referring to FIGS. 6–8, the invention relates to making a bearing structure particularly adapted for use in an electric motor which comprises a motor housing 10 of sheet metal or the like, a stator 13 fixed in housing 10 and rotor 14 mounted on a shaft 15. A bearing assembly 16 is provided at each end of the housing for rotatably supporting shaft 15.

As shown in FIGS. 6–8, each bearing assembly 16 comprises a wall 20 forming an integral end of the housing 10. The wall 20 has an opening therein and circumferentially spaced slots 23 extending radially to define cantilever segments 24. The free ends of the segments 24 are bent and extend axially as shown in FIG. 7 such that each segment includes a first generally radial portion 24a joined to the wall 20 and a second generally axial portion 24b extending axially and comprising the free end of each segment. The wall 20 is made of metal such that each segment 24 which is cantilever mounted has limited axial movement, as presently described.

The bearing structure further includes a bearing member 25 that comprises a sleeve 26 having an axial bore 27 for receiving the shaft 15 and an annular projection 28 that is curved transversely of the bearing member in a direction longitudinally of the bore 27 and preferably centered longitudinally of the bearing member. The center of the spherical contacting surface on the periphery of the projection 28 is aligned substantially on the axis of the bore 27, and in turn the cylindrical supporting surface defined by the inner surface of the portion 24b of the segments 24. The cylindrical supporting surface defined by the portions 24b of the segments 24 has a longitudinal extent sufficient to permit relatively unrestrained axial movement of the bearing member relative to the supporting surface. At least some, and preferably alternate segments 24 have their second portions 24b extending generally axially in directions opposite to those of the adjacent segments 24. An even number of segments is preferred.

In assembling the bearing, the bearing member 25 is forced axially to snap in position with the portions 24b applying opposing axial and radial forces to maintain the bearing member 25 in position.

In use, no external force is required to retain the bearing in position or in its seat because the support defined by the segments has its center at the center of the spherical surface on the bearing member. The force imposed by loads on the shaft 15 is thus directly statically balanced by the reaction of the support and it is impossible for the imposed radial load to pull the bearing from its seat.

In accordance with the invention the bearing structure is made from a workpiece which is first formed from a flat plate, which preferably has a coating of paint applied as by electrodeposition. The workpiece is formed with an annular portion 20 and circumferentially spaced radially extending fingers 24, the free ends of which define an opening (FIG. 10).

Figure 2:
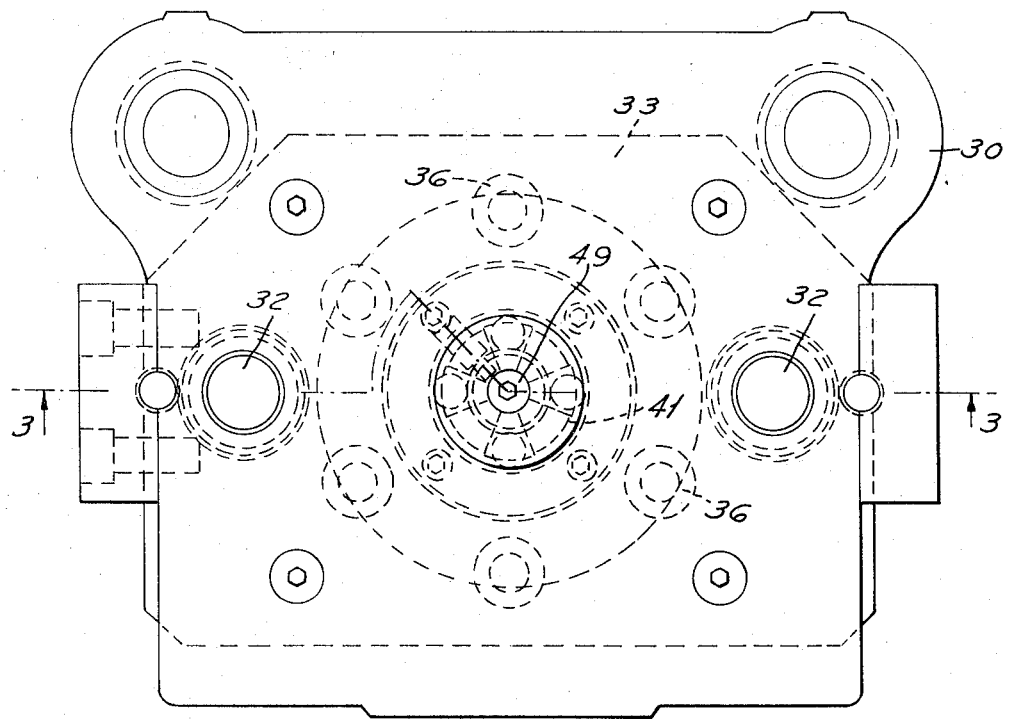
FIG. 2 is a plan view of another portion of the apparatus embodying the invention.
Figure 3:
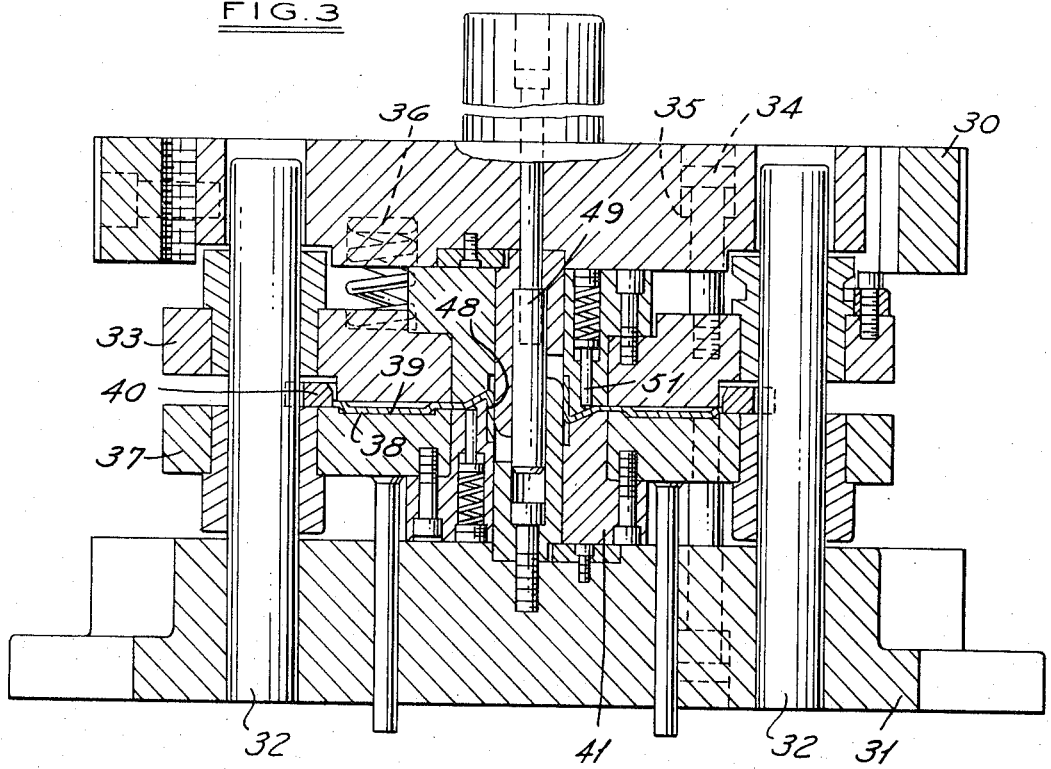
FIG. 3 is a fragmentary sectional view taken along the line 3—3 in FIG. 2.
Figure 4:
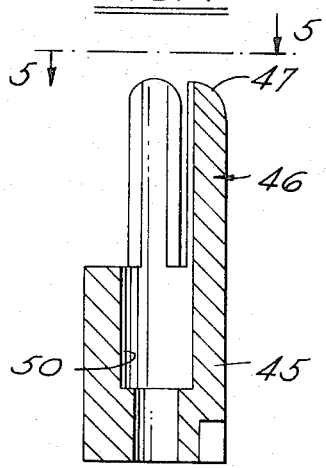
FIG. 4 is a fragmentary sectional view taken along the line 4—4 in FIG. .
Figure 5:
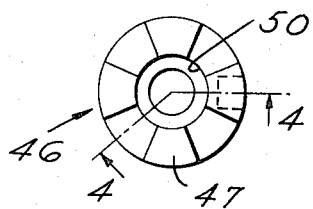
FIG. 5 is a plan view of a portion of the apparatus shown in FIG. 4.

Referring to FIGS. 1–3, the apparatus for forming the self-aligning bearing structure comprises die set 30, 31 that are adapted to be mounted in a mechanical or hydraulic press or the like. Guide rods 32 on die shoe 31 are adapted to guide the movement of the punch holder 30 toward and away from the shoe 31. Holder 30 yieldingly supports a movable plate 33 by pins 34 that are passed through openings in holder 30 and are threaded into the plate 33 and pins 34 are headed to engage the shoulders 35 in the holder 30. Springs 36 yieldingly urge the movable plate 33 away from the punch holder 30. The plate 33 is also guided by the guide rods 32.

Similarly a movable plate 37 is mounted on for movement toward and away from the shoe 31. Plate 37 includes an annular recess 38 for receiving a complementary annular portion 39 on the workpiece for locating the workpiece in cooperation with a peripheral member 40. Complementary die members 41 such as shown in FIG. 9 have circumferentially spaced projections 42 with inclined surfaces 43, 44 that are adapted to interengage and deform the portion spaced from the end of the workpiece at an angle to form portion 24a of each segment 24. Each of the die shoe and punch holder 30, 31 supports second die members 45 which comprise axially extending fingers 46 having curved ends 47. When the dies are moved toward one another, the fingers 46 mesh and each finger moves the free end of the portion of the segment axially bending it into contact with a recess 48 on its corresponding die member 41 to form portion 24a of each segment 24. In order to insure alignment upon engagement of the secondary die members 45, a shaft 49 is mounted on one of the die members and is movable into the opening 50 of the other member.

The apparatus further includes ejection pins 51 and other conventional devices of this type which are commonly found in such apparatus.

In operation, the workpiece is placed in position with the annular portion 39 located in recess 38 and the die set is then actuated bringing the fingers 46 into intermeshing relationship and thereby bending alternate fingers 24 of the workpiece into the desired configuration.

I claim:

1. The method of making a self-aligning bearing from a workpiece which comprises forming a plurality of circumferentially radially extending fingers in the workpiece with the free ends forming an opening, simultaneously engaging portions of said fingers at points spaced from the ends thereof and bending said portions to an intermediate position between a radial and axial position and thereafter simultaneously bending the end portions of said fingers so that they extend axially, some of the end portions extending in opposite directions from the others.

2. The method of making a self-aligning bearing from a workpiece having a plurality of radially extending fingers having their free ends forming an opening which comprises simultaneously bending said fingers alternately axially in opposite direction, to define a plurality of surfaces forming supports for a bearing member.

3. The method of making a self-aligning bearing from a workpiece which comprises forming a plurality of circumferentially spaced radially extending fingers in the workpiece with the free ends forming an opening, simultaneously engaging portions of said fingers at points spaced from the ends thereof and bending said portions to an intermediate position between a radial and axial position and thereafter simultaneously bending the end portions of said fingers so that they extend axially, some of the end portions extending in opposite directions form the others.

4. The method of making a self-aligning bearing from a workpiece which comprises forming a plurality of circumferentially spaced radially extending fingers in the workpiece with the ends of said fingers forming an opening, bending some of said fingers axially in one direction, bending others of said fingers axially in the opposite direction to define a plurality of surfaces forming supports for a bearing member, said fingers being simultaneously engaged and bent in opposite axial directions.

* * * * *